Figure 1:
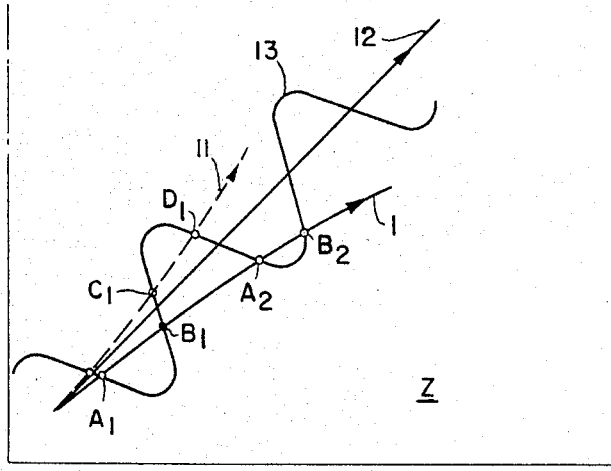

Oct. 11, 1966      W. EISSFELDT      3,278,750
PHOTOELECTRIC SCANNER FOR CONTROL OF FABRICATING MACHINERY
Filed Dec. 18, 1964                    4 Sheets-Sheet 1

United States Patent Office 3,278,750
Patented Oct. 11, 1966

3,278,750
PHOTOELECTRIC SCANNER FOR CONTROL OF
FABRICATING MACHINERY
Wilhelm Eissfeldt, Munich, Germany, assignor to Siemens - Schuckertwerke Aktiengesellschaft, Berlin - Siemensstadt and Erlangen, Germany, a corporation of Germany
Filed Dec. 18, 1964, Ser. No. 419,330
Claims priority, application Germany, Dec. 21, 1963,
S 88,846
6 Claims. (Cl. 250—202)

My invention relates to a scanner for controlling the travel of machinery, such as the tool feed in a machine tool, in accordance with a given line or curve to be traced.

Most of the known photoelectric scanners or tracers for such purposes comprise a photoelectric cell, a system of optical lenses which projects an image of a curve point or element being traced onto the photocell, and in many cases also an oscillating system which affords a higher resolving power than statically operating scanning devices. In many cases, the oscillatory system consists of a periodically vibrating mirror. The scanner head, which contains the just-mentioned components, travels at normally constant speed relative to a reference plane on which the controlling curve is exhibited. For this purpose the scanner head is mechanically or electrically coupled with the tool support or feed drive so that the travel of the scanner head is proportional to the travel of the tool, although in some cases on a reduced or an enlarged scale. There are also control devices in which the scanner head and the tool are stationary whereas the workpiece is moved relative thereto.

As soon as the travel direction of the scanner head relative to the workpiece commences to slightly depart from the prescribed course, a scanner of the above-mentioned type issues a control signal to a control motor which rotates the scanner head about an axis perpendicular to the feed travel. This rotational displacement of the scanner head is indicative of the error or departure from the proper feed travel and is a characteristic feature of any follow-up system of this kind. The rotational displacement of the scanner head is processed either mechanically or electrically to furnish a feed-control signal. This may be done, for example, by coupling the armature of a conventional coordinate resolver with the scanner head, the armature winding of the resolver being energized by alternating voltage. The stator of such a resolver carries two windings spatially displaced 90° from each other to furnish two output voltages which control respective motors assigned to two mutually perpendicular directions of feed travel. These two feed motors drive the support of the tool and thus also the scanner head coupled therewith.

Another way of controlling the direction of the tool feed in response to the rotational displacement of the scanner head is to have the tool coupled with a driving wheel which rotates at constant speed and is supported on a fixed reference plane so that the wheel causes the tool to travel relative to this plane. The driving wheel is journalled on a swivel pivoted about an axis transverse or perpendicular to the wheel axis. The swivel is also coupled with the scanner head so that its swiveling rotation always corresponds to the rotational displacement of the scanner head. A system of this type is described in detail in the British Patent 885,026, for example.

Control systems in which the driving wheel rolls on a rotationally mounted drum whose axis extends parallel to one coordinate ($x$) of the travel to be controlled operate substantially on the same principle. The drum shaft is journalled on a support capable of moving in the direction of the other travel coordinate ($y$-direction) relative to the reference plane on which the control curve is exhibited, the drive wheels for the support being coupled with the drum shaft. The scanner head itself is mounted on the support in such a manner that it can move in the $x$-direction relative to the support. A swiveling rotation of the driving wheel causes the scanner head to move relative to the shaft of the support, and the support then moves relative to the reference plane, whereby the travel of the driving wheel is resolved into two coordinate components. A similar device has also been equipped with a ball in lieu of a shaft.

The present invention, more particularly, concerns itself only with an optical scanner for use in control systems generally of the above-mentioned types. For that reason it will be helpful to further explain the performance required of such a scanner. This will be done with reference to the accompanying drawing in which—

Figure 2:
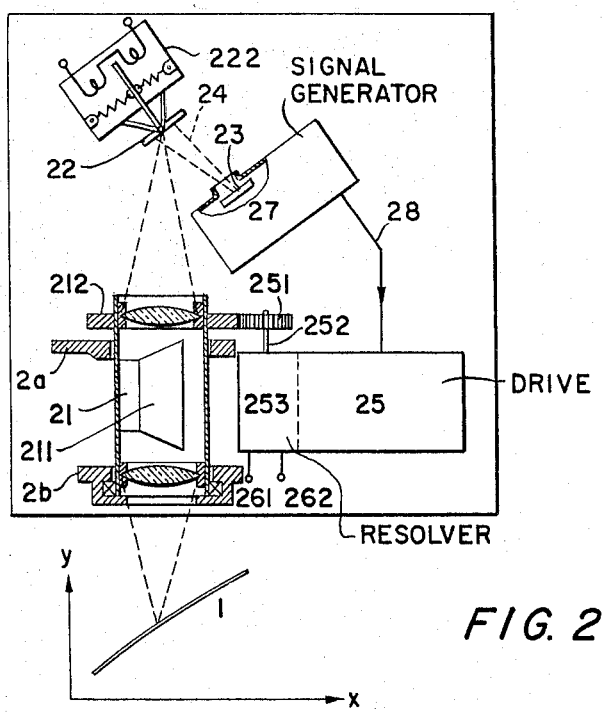
Figure 3:
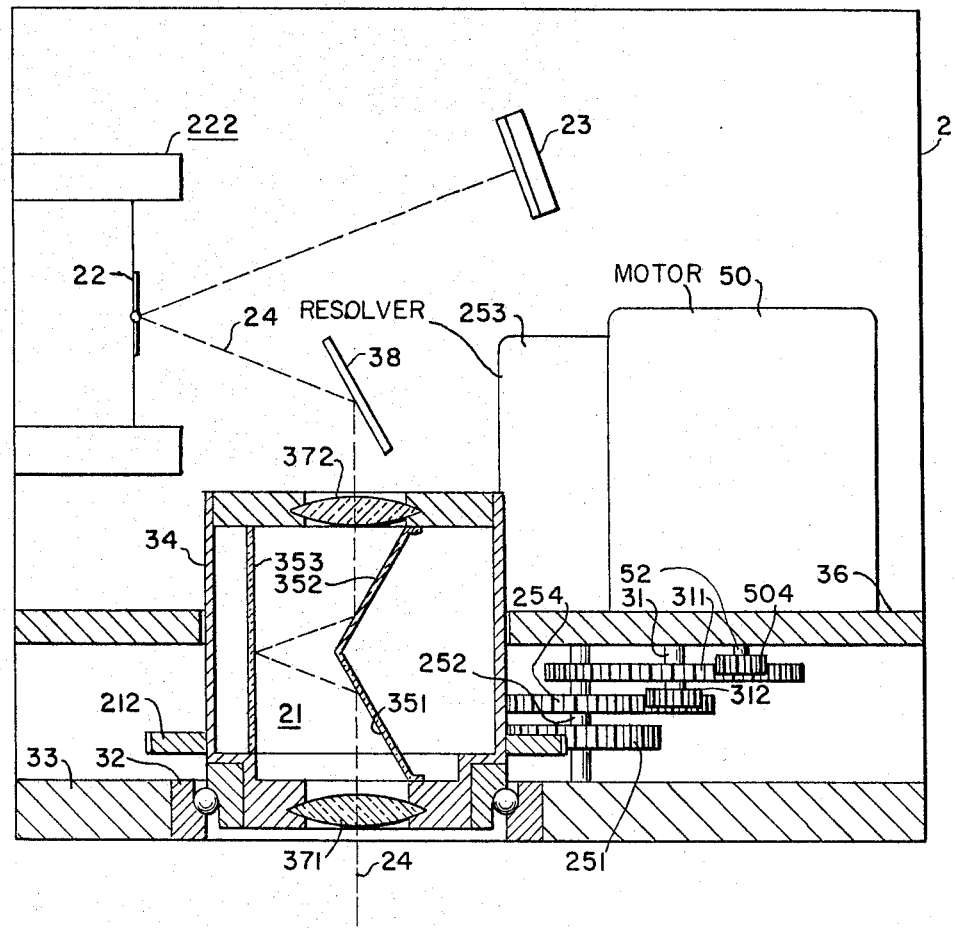
Figure 4:
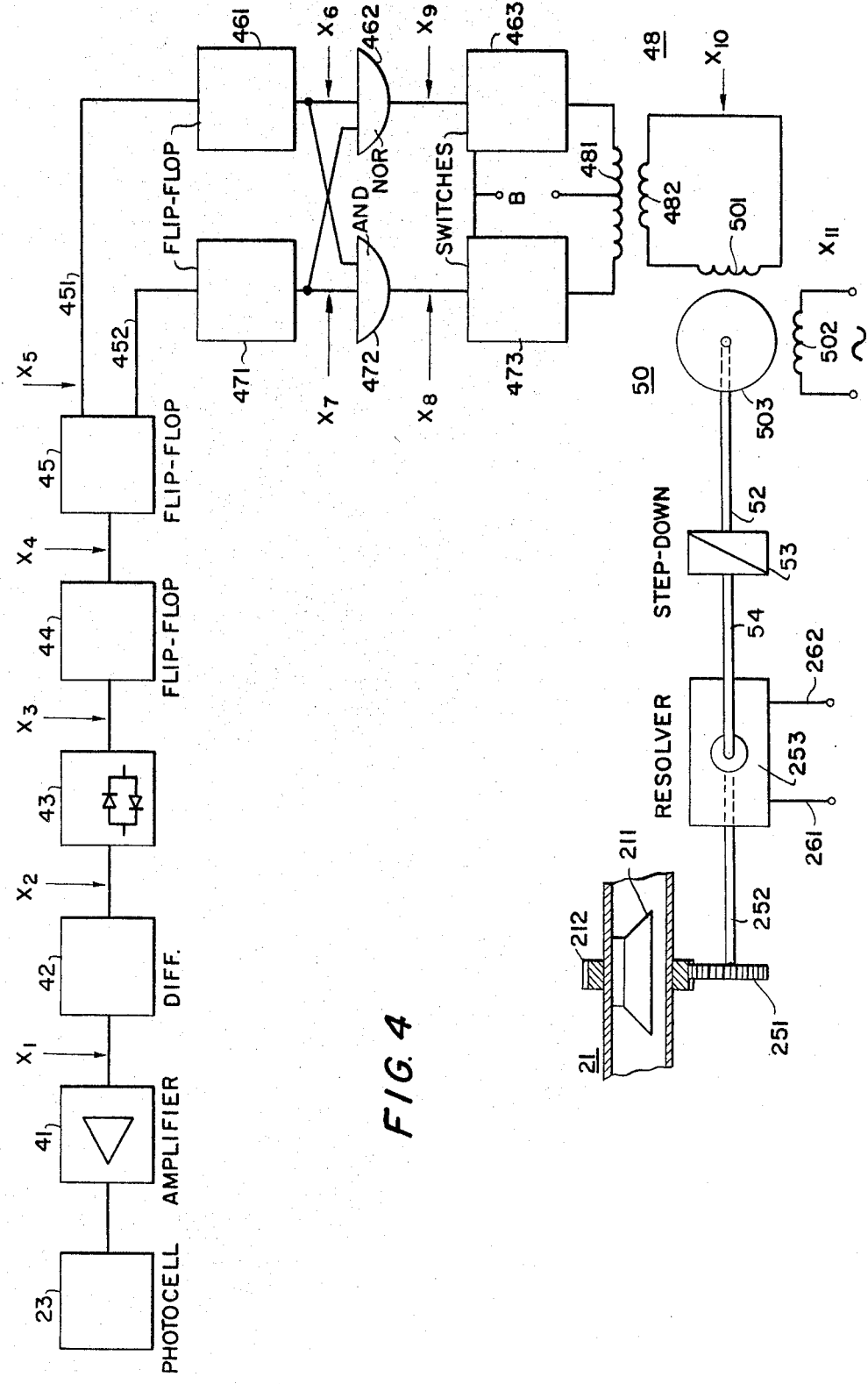
Figure 5:
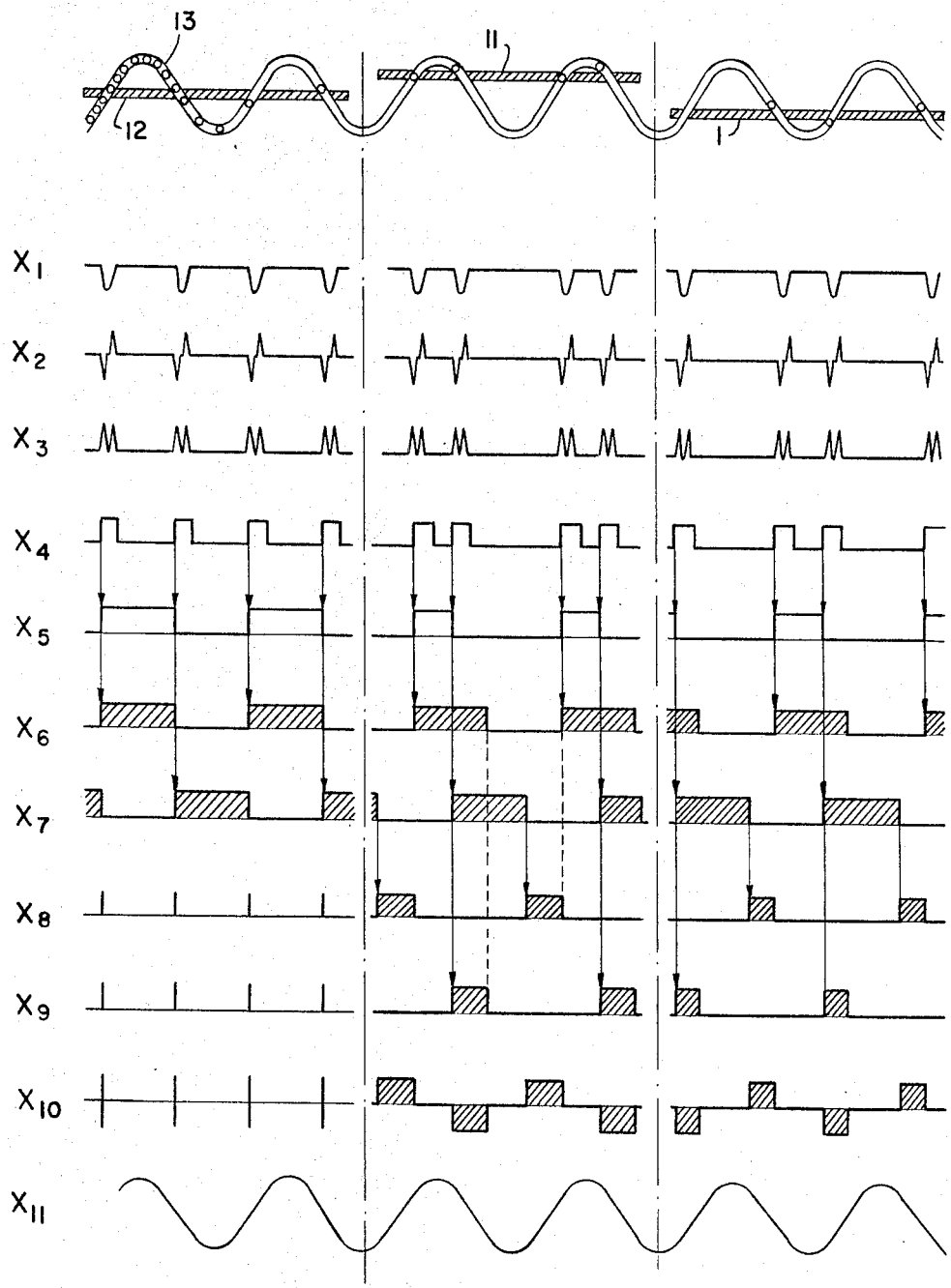

FIG. 1 is an explanatory diagram;

FIGS. 2 and 3 exemplify schematically two embodiments of scanner heads according to the invention;

FIG. 4 shows an electric diagram and FIG. 5 a graph of voltage curves relating to operation of scanners as shown in FIGS. 2 and 3.

The required performance of the scanner head will be understood from the following in conjunction with the diagram of FIG. 1 in which 1 denotes the curvilinear representation graphically shown on a sheet of drawing Z or other reference plane which, for example, is here assumed to be stationary during operation. The curve 1 indicates the desired travel course of a tool, for example a cutting torch. The scanner head, located above the reference plane Z but not shown in FIG. 1, travels in the above-described manner along a line denoted by 12 in FIG. 1.

The optical lens system of the scanner head projects upon a photocell an image of a small element of the reference plane Z just being scanned. This area element, if desired, may be illuminated by a spot of light indicating the travel direction of the scanner head. Located in the ray path of the image thus projected on the photocell is an oscillating mirror which, in most cases, is magnetically driven by alternating voltage of the conventional 60 or 50 c.p.s. frequency taken from a utility line. The mirror thus performs a periodic movement, generally a sinusoidal oscillation.

Assume that during operation the scanner head travels together with the tool at constant feeding speed relative to the reference plane Z and relative to the workpiece to be machined. The travel path, as mentioned, may then correspond to the path 12 rather than to the desired curve 1. In this case the image thrown onto the photocell oscillates periodically in accordance with the curve 13. This periodic curve intersects the reference curve 1 at points $A_1$, $B_1$, and $A_2$, $B_2$. As long as the actual travel of the scanner head coincides with the desired travel direction represented by the curve 1, the distance between each two intersections $A_1$ and $B_1$, $A_2$ and $B_2$ is equal. The distance between each two points, however, changes if the actual travel of the scanner head departs from the desired course. The direction of the departure is always determined by the position of the intersection points in the half-waves of the mirror oscillations corresponding to the half-waves of the alternating voltage driving the mirror.

For illustration, reference is made to the broken line 11 in FIG. 1 whose points of intersection with the image line 13 of the photocell are denoted by $C_1$ and $D_1$. At the intersection points of the periodic curve 13 with the reference curve 1 and the travel curve 11, the photocell issues two pulses respectively which occur at the transition from bright to dark and from dark to bright. In cases where the control program is not represented by a line or curve but by a contour to be traced, the photocell issues only one pulse at each intersection, namely when passing from bright to dark. The mutual spacing of the pulses constitutes a measure for the departure of the actual travel from the desired travel, and is translated and amplified into signals which are applied to a control system which rotates the scanner head to such an extent that the intersection points $A_1$, $B_1$, $A_2$, $B_2$ again coincide with the zero passages of the sinusoidal image curve 13 of the photocell, that is until the time points of intersection are all equally spaced from each other.

Consequently as soon as the actual travel of the tool, represented by the line 12, departs only slightly from the desired travel represented by the reference curve 1, the error signal causes the scanner head to be rotated until the angle of inclination of line 12 again corresponds to that of the curve 1. Thus the regulating error is reduced to zero.

All of the above-mentioned known control systems have in common that the scanner head, comprising the photocell as well as the oscillating mirror and the lens system, is rotated by the control drive, so that the rotation of the entire scanner head is a measure for the departure of the tool travel from the desired course. The speed of response afforded by such a system is appreciably limited by the fact that the operation requires the acceleration and deceleration of the relatively large mass constituted by such a scanner head. Another limitation and source of trouble is the necessity of providing slip rings and brush contacts for issuing the photocell signals from the scanner head.

It is an object of my invention to provide a scanner head for machinery travel control systems generally of the above-mentioned types, which greatly minimize or eliminate the above-mentioned shortcomings.

More specifically, it is an object of the invention to devise a photoelectric scanner head for tracer control which affords greatly reducing the mass of the structure that must be rotated for performing a control or regulating operation of the type explained with reference to FIG. 1.

Another, more specific object of the invention is to afford providing a photoelectric scanner head, operating with a departure-responsive rotation, with a fixed mounting of the photocell, electric conductors and other circuit components, thus avoiding the use of slip rings or flexible connections between the rotating and the stationary parts of the scanner head.

According to the invention, the photocell and the oscillatory mirror, as well as the electrical components and circuitry for translating the signals issuing from the photocell, are mounted on a supporting structure of the scanner head, and only the optical imaging system for projecting an image of the curve elements via the reflector onto the photocell is rotational, and is separately mounted on the supporting structure of the scanning head for rotation about the optical axis of the imaging system under control by the photocell signals.

According to another feature of my invention, the rotational imaging system is designed to optically reverse the image with respect to two mutually perpendicular coordinate dimensions. It suffices if the image is reversed only with respect to one of these two coordinate dimensions.

According to another, more specific feature, the image reversal in the optical system is effected by means of a reversing prism, such as a Dove prism or Pechan prism. Prisms of this kind are described, for example, in McGraw-Hill Encyclopedia of Science and Technology, 1960, vol. 8, pages 507 and 508. Also applicable are assemblies of three mirrors or prisms mounted in mutually staggered relation; and it suffices for the purpose of the invention if, in some cases, only one or more components of such a composite assembly are subjected to mechanical rotation about the optical axis.

According to another feature of the invention, the conventional coordinate resolver with which the optical system is connected is preferably joined therewith by a mechanical transmission having a step-down ratio of 2:1, because the rotation of the optical system about the angle $\alpha$ corresponds to a rotation of the image about the angle $2\alpha$. With such a transmission, therefore, the rotation of the coordinate resolver coupled with the control motor for rotating the optical prism corresponds to the actual rotation of the image effected by the optical system.

It has been found advisable to illuminate the particular spot of the curve 1 by a light spot in the shape of an arrow indicating the instantaneous direction of the feed travel. For this purpose the area of the curve 1 being scanned may be illuminated from a light source in whose ray path a diaphragm with an arrow-shaped opening is placed, this diaphragm being coupled with the control motor by a transmission gearing so that the arrow will point in a direction corresponding to the displacement angle of the optical system.

FIG. 2 shows schematically a photoelectric scanner head embodying the above-mentioned features of the invention. As explained, the scanner head 2 may be coupled with the tool support of a machine tool by mechanical or electrical means, either directly or through a transmission of any desired ratio. The scanner head moves over a reference plane represented schematically by a system of coordinates $x$, $y$ exhibiting the reference curve 1, corresponding to the one shown in FIG. 1.

The scanner head comprises an optical system 21 which comprises two focusing lenses and an intermediate Dove prism 211 coaxially mounted in a cylindrical sleeve which is rotatably journalled in bearings 2a and 2b fixed to the supporting structure of the scanner head. Thus, the optical system is rotatable about its optical axis extending in the vertical direction. A ring-shaped spur gear 212 is coaxially joined with the sleeve of the optical system and meshes with a spur gear 251 whose shaft 252 is connected with a coordinate resolver 253 driven from a reversible drive schematically represented at 25. The resolver 253 furnishes two coordinately interrelated output voltages at respective terminals 261 and 262, relative to ground or zero potential in the conventional manner. The coordinate resolver 253 may comprise any suitable apparatus known in the art such as, for example, that described in U.S. Patent No. 2,933,668, issued April 19, 1960, as the resolver device 64 or that described in U.S. Patent No. 2,499,178, issued February 28, 1950 as the Selsyn 45.

An oscillating mirror 22 is pivotally mounted on the supporting structure of the scanning head, the pivot axis being located in the plane of reflection. The mirror forms part of a resonance system which is driven electromagnetically to perform periodic sinusoidal oscillations about the pivot axis of the mirror 22. This is schematically indicated by springs which tend to hold the mirror 22 in the midposition and act upon an armature which forms part of the oscillating mass and is located in the field of an electromagnet whose terminals are to be connected to a 50 c.p.s. utility line.

A photocell 23 is fixedly mounted on the supporting structure of the scanning head opposite the mirror 22 and forms part of a translating and signal generating circuit schematically shown at 27. The output signals from this circuit pass through a connecting line 28 to the drive 25 in which they control a motor for turning the resolver 253 and the optical system 21 in one or the opposite direction.

The diameter of gear 212 is twice as large as that of gear 251 so that one rotation of the optical system 21 corresponds to two full rotations of the resolver 253.

The distance of the scanner head 2 from the reference plane with control curve 1, and the distances between the optical system 21 and the oscillating mirror 22 and between mirror and photocell are so chosen that the illuminated spot of the reference plane appears on the photocell 23.

It will be understood that the scanner head may be modified by having the lenses of the optical system remain stationary so that only the prism 211 is rotated.

Aside from the fact that only the optical system or part thereof is rotated, the performance of a scanner according to the invention is essentially in accordance with the explanation given above with reference to FIG. 1. When the scanner head 2, traveling, for example, together with the tool feed of a machine tool, departs from the proper course represented by the curve 1, the photocell 23 causes the appertaining circuitry 27 to pass a control signal to the control drive 25 which then rotates the optical system 21 until the travel curve 12 of the scanner head again coincides with the datum curve 1 in FIG. 1 as set forth above. During this regulating operation, the resolver 253 is rotated through an angle twice as large as the rotational angle of the optical system 21. The voltages then issuing from the resolver terminals 261 and 262 control the two feed motors assigned to the x-direction and y-direction respectively so that the tool feed, together with the travel of the scanner head 2, always is along the course prescribed by the curve 1.

It will be noted that in a scanner head according to FIG. 2 only the relatively small mass of the optical system is placed in rotation for effecting the desired travel regulation, as contrasted to the much larger total mass of the entire scanner-head structure. Thus the inertia of the rotating system which affects the travel regulation is greatly reduced, resulting in a corresponding reduction in the required time of response. Furthermore, all electrical components and connections are permanently mounted, thus avoiding any slip rings or other electrical connections between the rotational system and the photocell circuits.

The scanner 8 shown in FIG. 3 is largely similar to that of FIG. 2, the same reference numerals being applied to corresponding components respectively. As shown in FIG. 3, the optical system 21 is rotatably mounted by means of a ball bearing 32 on a base plate 33 and comprises a cylindrical housing 34 in which three mirrors 351, 352 and 353 are so mounted that one coordinate of each mirror is parallel to the corresponding one coordinate of each other mirror. A spur gear 212, coaxially joined with the cylindical housing is coupled with the control motor 50 by a transmission which comprises two spur gears 251 and 254 coaxially fastened on the rotor shaft 252 of the resolver 253. Gear 251 meshes with the gear 212, and gear 254 meshes with a gear 312 fastened on a shaft 31 in coaxial relation to another spur gear 311 meshing with a pinion 504 on the shaft 52 of the control motor 50. The resolver 253 and the control motor 50 are mounted on a carrier plate 36.

A beam of light 24 coming from the reference plane passes through a lens 371 into the interior of the cylinder 34 and impinges upon the mirror 351. The reflected portion impinges upon the second mirror 353 which throws the beam onto the third mirror 352. Thence the light is reflected through a lens 372 onto a deflecting mirror 38 which throws the light beam 24 upon the vibrating mirror 22 of the oscillatory system 222, corresponding to the one described above with reference to FIG. 2.

FIG. 4 represents an example of an electrical system applicable in conjunction with a scanner head according to FIG. 2 or FIG. 3 for applying the signals furnished from the photocell to the control of the control motor. To the extent the components shown in FIG. 4 correspond to those of FIGS. 2 and 3, they are designated by the same reference characters respectively. Also entered in FIG. 4 are reference characters $X_1$ to $X_{11}$ which denote the locality of voltages represented by the voltage-time graphs in FIG. 5 in which the horizontal coordinate of each individual graph denotes time and the vertical coordinate denotes voltage amplitude.

The pulses furnished from the photocell 23 pass through an amplifier 41. The amplified pulses $X_1$ (FIGS. 4, 5) are supplied to a differentiating member 42. The output voltage $X_2$ (FIGS. 4, 5) of the differentiating member passes through a two-way rectifier 43 to a monostable flip-flop stage 44. The output pulses $X_4$ of flip-flop 44 control a bistable flip-flop stage 45 with two outputs 451 and 452 to which respective monostable flip-flop stages 461 and 471 are connected. The timing period of the stages 461 and 471 corresponds exactly to the duration of one-half wave of the keying cycle, namely to one-half oscillation of the mirror 22 in FIG. 2 or FIG. 3. An AND gate 462 with two inputs is correlated to the stage 461, and a NOR gate 472 with two inputs is correlated to the stage 471. Each of the two gates receives the output signals from both monostable flip-flops 461 and 471. The respective output signals $X_8$ and $X_9$ of the gates control respective switching stages 463 and 473 which connect the two half portions of a primary winding 481 of a transformer 48 to a source of direct voltages connected between terminals B. As is apparent from FIG. 5, the two switching stages 463 and 473 are alternately turned on, so that the secondary winding 482 of transformer 48 provides a rectangular-wave voltage $X_{10}$ whose pulse width is in accordance with the regulating error, namely proportional to the departure of the actual scanning-head travel from the reference curve, the actual travel being denoted in FIG. 5 by 1, 11 and 12 respectively.

The alternating voltage $X_{10}$ is supplied to one excitation winding 501 of an alternating-voltage control motor 50 which has a second excitation winding 502 displaced 90° from the winding 501 and energized by alternating voltage $X_{11}$ (FIG. 5) of constant frequency and constant amplitude. The frequency of voltage $X_{11}$ corresponds to the oscillating fequency of the vibrating mirror 22. That is, the voltage $X_{11}$ may be taken from the same 50 c.p.s. utility supply from which the oscillator 222 is energized.

The rotor 503 (FIG. 4) of control motor 50 is connected through a shaft 52, a step-down transmission 53 and a shaft 54 with the coordinate resolver 253 shown also in FIGS. 2 and 3. The resolver furnishes at its two outputs 261 and 262 two control voltages of which one corresponds to the sine and the other to the cosine of the angle through which the armature of the resolver 253 has been turned by the control motor 50. These two signals, as mentioned, are available for controlling two feed motors coordinately determining the two feed directions of a tool support. Since the scanning head is mechanically or electrically coupled with the tool support, the travel of the scanner head relative to the reference plane corresponds to the feed travel of the tool support.

The shaft 54 drives through another shaft 252, a gear 251 meshing with the gear 212 which, in turn, rotates the optical system 211 as described with reference to FIGS. 2 and 3.

In a system as described above, the control motor associated with the scanner head continues running until the rotational displacement of the optical system 211 causes the line 1 or 11 being scanned to be placed accurately in the center position of line 12 in FIG. 5. When this center position is reached, the alternating voltage supplied to the excitation winding 501 of the control motor 50 is virtually equal to zero, so that the motor delivers no torque.

In FIG. 5 the voltage-time curves at different localities of the system shown in FIG. 4 are exhibited with reference to three different conditions of operation. The curves in the left portion of FIG. 5 relate to an operation in which the regulating error is zero, the actual feed travel of the tool being coincident with the prescribed travel course. The curves shown in the middle portion of FIG. 5 relate to a condition in which the regulating error has a finite value in the positive direction; and the curves shown in the right portion of the diagram relate to a negative direction of the regulating error.

To those skilled in the art it will be obvious upon a study of this disclosure that my invention permits of various modifications and may be given embodiments other than particularly illustrated and described herein, without departing from the essential features of my invention and within the scope of the claims annexed hereto.

I claim:

1. A photoelectric scanner for controlling the travel of machinery according to a given curve, comprising a fixedly mounted photocell, an optical imaging system having an optical axis to be directed toward the curve to be scanned and being rotatable about said axis, optical mounting means rotatably mounting said optical imaging system, an oscillatory reflector optically intermediate said system and said photocell for periodically reflecting an image of respective curve elements upon said cell to produce cell pulses having a variable time spacing dependent upon departure of said travel from said curve, reflector mounting means fixedly mounting said oscillatory reflector, and reversible drive means mechanically connected with said optical system for rotating it about said axis and electrically connected to said photocell to be controlled in response to said pulses.

2. A photoelectric scanner for controlling the travel of machinery according to a given planar curve, comprising a fixedly mounted photocell, an optical imaging system having an optical axis to be directed toward the curve to be scanned and being rotatable about said axis, optical means rotatably mounting said optical imaging system, said system having reversing means for directionally reversing the direction of one of the two coordinates of the curve, an oscillatory reflector optically intermediate said system and said photocell for periodically reflecting an image of respective curve elements upon said cell to produce cell pulses having a variable time spacing dependent upon departure of said travel from said curve, reflector mounting means fixedly mounting said oscillatory reflector, and reversible drive means mechanically connected with said system for rotating it about said axis and electrically connected to said photocell to be controlled in response to said pulses.

3. A photoelectric scanner for controlling the travel of machinery according to a given curve, comprising a supporting structure to move with the travel to be controlled, a photocell fixedly mounted on said structure, an optical imaging system having an optical axis to be directed toward the curve to be scanned and being rotatably mounted on said structure for rotation about said axis, said optical imaging system having reversing means for directionally reversing the direction of one of the two coordinates of the curve, an oscillatory reflector fixedly mounted on said structure optically intermediate said system and said photocell for periodically reflecting an image of respective curve elements upon said cell to produce cell pulses having a variable time spacing dependent upon departure of said travel from said curve, a reversible drive mechanically connected with said system for rotating it about said axis and electrically connected to said photocell to be controlled by said pulses, and coordinate resolver means connected with said system for issuing two travel control signals according to respective coordinates of the system rotation.

4. In an optical scanner according to claim 1, said imaging system comprising a one-dimension reversing prism.

5. An optical scanner according to claim 3, comprising a resolver interposed between said drive and said optical system, and a step-down transmission gear connecting said resolver with said system and having a 2:1 transmission ratio.

6. An optical scanner according to claim 3, comprising a one-dimension reversing prism in said optical imaging system, a resolver interposed between said drive and said optical system, and a step-down transmission gear connecting said resolver with said system and having a 2:1 transmission ratio.

References Cited by the Examiner

UNITED STATES PATENTS

| | | | |
|---|---|---|---|
| 2,499,178 | 2/1950 | Berry et al. | 318—162 |
| 2,933,612 | 4/1960 | Cheverton et al. | 250—235 |
| 2,933,668 | 4/1960 | Brouwer | 250—202 X |
| 3,050,669 | 8/1962 | Mosleley et al. | 250—202 X |

RALPH G. NILSON, *Primary Examiner.*

WALTER STOLWEIN, *Examiner.*